Feb. 20, 1934.  B. D. McINTYRE  1,947,788

SOUND ABSORBING PANEL

Filed Jan. 18, 1932

INVENTOR
Brouwer D. McIntyre
BY
Whittemore Hulbert Whittemore & Belknap
ATTORNEYS Patented Feb. 20, 1934

1,947,788

UNITED STATES PATENT OFFICE 1,947,788

SOUND ABSORBING PANEL

Brouwer D. McIntyre, Monroe, Mich., assignor to Insulation Development Corporation, Monroe, Mich., a corporation of Michigan Application January 18, 1932. Serial No. 587,435

2 Claims. (Cl. 154—44)

This invention relates to sound absorbing panels and to the method of manufacturing the same.

Panels constructed in accordance with this invention, while capable of many and varied uses, find particular utility in use in connection with motor vehicle bodies and the like for insulating, for instance, the dash so as to prevent the noises from the engine from entering the interior of the vehicle.

An object of this invention is to produce a panel structure including a body or filler of fibrous material together with, for instance, asphalt or some other binder and powdered rubber, this body material or filler being then enclosed in a casing or envelop of sheet rubber.

The characteristics of the resulting structure is such that sounds are not only adequately obstructed but are actually absorbed so that panels of this nature are especially efficient in insulating motor vehicle bodies against sound.

Another object of the invention is to so construct the panels during the method of manufacture that provision is made for the passage through the panel of cables, rods, wires and other controlling or connecting means which customarily pass through the dash of a motor vehicle.

Still another object of the invention is to provide a method of manufacture wherein an internal pressure is set up in the panel during manufacture so as to hold one or both sides of the panel firmly in engagement with the mold whereupon designs in relief or intaglio may be imparted to the surface of the panels from the contacting portions of the mold.

Figure 1:
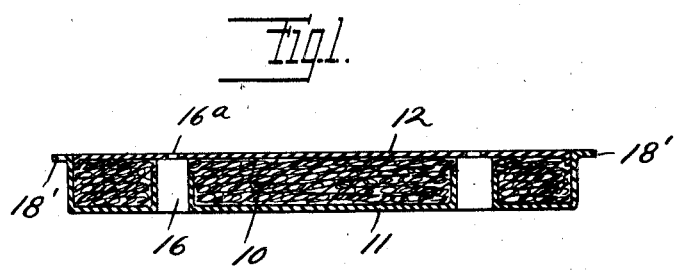
Figure 2:
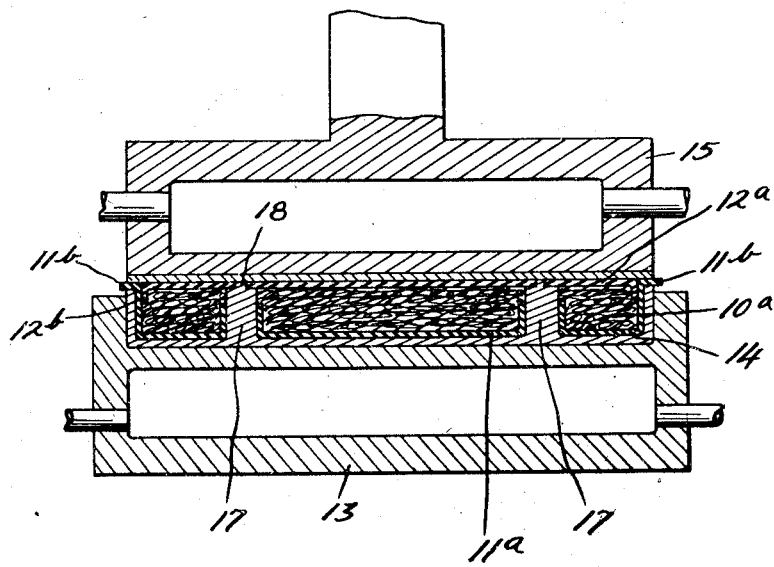

The several objects, advantages and novel details of construction of the invention will be made more apparent as this description proceeds, especially when considered in connection with the accompanying drawing wherein Figure 1 is a transverse sectional view through a sound absorbing panel constructed in accordance with this invention, and Figure 2 is a sectional view through the molding apparatus.

As shown in Figure 1 the panel consists of a body or filler 10 composed of fibrous material. While various types of fibrous material may be employed, jute fibre or waste jute has been found to be particularly efficient. Asphalt is mixed with the fibrous material together with powdered rubber.

This material is enclosed in a casing or envelop consisting of sheets of rubber 11 and 12. Sheets of unvulcanized rubber are preferable.

The fibrous material together with the asphalt and rubber may first be formed into sheet form before introduction into the envelop or casing, or it may be introduced therein in a loose form as will be hereinafter described more in detail.

In Figure 2 there is illustrated a lower mold part 13 which is heated, which mold part has a recess 14 in which a sheet of unvulcanized rubber 11ᵃ is placed. This rubber sheet is of sufficient size to permit its margin 11ᵇ to project beyond the edges of the mold recess as clearly shown in Figure 2. The filling material 10ᵃ is then introduced. This filling material consists approximately of 60% fibrous material and 40% asphalt and powdered rubber. This material is spread evenly throughout the mold recess 14 and thereafter another sheet 12ᵃ of unvulcanized rubber is placed in position and the edges 12ᵇ are tucked in. Then the upper mold member 15, which is also heated, is brought into position to press together the rubber sheets 11ᵃ and 12ᵃ and the filling material 10ᵃ. While thus under pressure the heat from the mold members vulcanizes the rubber sheets and unites these sheets together at their points of engagement.

At the same time the filling material, having been subjected to pressure and heat, the asphalt causes the fibrous material to bind together into a substantially sheet-like body and the powdered rubber is melted and compressed and combines with the fibrous material to impart an inherent resiliency to the structure and to form a plurality of minute air cells which expand somewhat when the pressure of the mold members is relieved with the result that a slightly compressible or resilient cellular structure is provided which acts in use to efficiently absorb sound. The rubber envelop or casing protects the body of the panel from disintegration and provides a smooth or finished exterior desirable in panels of this type, particularly when the same are used as insulation in motor vehicles.

If, during the process of manufacture, it is desirable to provide the panel with openings 16 therethrough so that speedometer cables, control rods, wires or the like can be passed therethrough, one of the mold parts may be provided with studs 17 having reduced end portions 18. Thus when the rubber sheet 11ᵃ is placed in the mold it will be provided with apertures which will be fitted over the stud 17 as illustrated in Figure 2, and when the mold parts are brought together the upper rubber sheet 12ᵃ will be pressed against the studs 18 to partially produce apertures in the upper side of the panel which may subsequently be pressed through. Thus, as seen in Figure 1 the resulting panel would be provided with the relatively large openings or apertures 16 extending substantially through the panel whereas the rubber sheet 12 will be provided with restricted openings 16ᵃ which will tightly engage the cables, rods, wires or the like so as not to permit the passage of sound through the openings. It will be understood that the very nature of the rubber sheet 12 will permit the apertures to be stretched so as to accommodate cables, rods and the like of different size but nevertheless to tightly engage the same.

Obviously, other means may be employed for providing apertures through the panels during the process of manufacture.

Sometimes it is desirable in panels of this nature to form designs on the surfaces thereof, either in relief or intaglio. Because of the compressible nature of the panel it would be difficult to produce these designs faithfully. To this end, I contemplate introducing in the mixture when it is desired to produce designs on the panel, a small amount of bicarbonate of soda. This, under the action of the heat of the molds, will combine with the filling material to produce a gas which will tend to expand the panel and press the top and bottom walls thereof against the adjacent faces of the mold members upon which, of course, the desired designs in relief or intaglio would be inscribed. Thus, the walls of the panel, during the molding operation, would be pressed against the mold members so that the designs carried thereby would be transferred to the top and bottom walls of the panel. When the panel is subsequently removed from the mold members and cooled, the gas would subside.

The margin portions 11ᵇ of the sheet 11ᵃ, in the finished panel, provide a peripheral flange or apron 18¹ which can be used to adequately close the space between the edge of the panel and the adjacent vehicle body parts when the panel is used to insulate the dash of a motor vehicle body.

Having thus described my invention, what I claim is:

1. A sound absorbing panel comprising an outer covering of vulcanized sheet rubber and a filler of fibrous material, asphalt and powdered rubber, in substantially the proportions of 60% fibrous material and 40% asphalt and powdered rubber.

2. A sound absorbing panel consisting of an outer casing of vulcanized sheet rubber and a body composed of substantially 60% jute fibre and 40% asphalt and powdered rubber.

BROUWER D. McINTYRE.